United States Patent [19]

Nohda

[11] Patent Number: 4,534,645
[45] Date of Patent: Aug. 13, 1985

[54] AUTOMATIC LENS METER

[75] Inventor: Masao Nohda, Yokosuka, Japan

[73] Assignee: Nippon Kogaku K. K., Tokyo, Japan

[21] Appl. No.: 389,055

[22] Filed: Jun. 16, 1982

[30] Foreign Application Priority Data

Jun. 26, 1981 [JP] Japan .................................. 56-98405

[51] Int. Cl.³ ............................................. G01B 9/00
[52] U.S. Cl. ...................................... 356/125; 356/127
[58] Field of Search ................. 356/124, 125, 126, 127

[56] References Cited

U.S. PATENT DOCUMENTS

| | | | |
|---|---|---|---|
| 2,640,392 | 6/1953 | Freeman | 356/126 |
| 3,880,525 | 4/1975 | Johnson | 356/127 |
| 3,981,589 | 9/1976 | Spitzberg | 356/125 |
| 4,180,325 | 12/1979 | Humphrey | 356/127 |
| 4,275,964 | 6/1981 | Vassiliadis | 356/127 |
| 4,329,049 | 5/1982 | Rigg et al. | 356/124 |

Primary Examiner—R. A. Rosenberger
Attorney, Agent, or Firm—Shapiro and Shapiro

[57] ABSTRACT

An automatic lens meter includes a first positive lens system, a second positive lens system having its forward focal plane coincident with the rearward focal plane of the first positive lens system, a pin-hole plate disposed in the forward focal plane of the second positive lens system, the optical axis of the first and second positive lens systems passing through the pin-hole of the pin-hole plate, four spot light source means disposed on the forward focus side of the first positive lens system, the four spot light source means being provided in a plane orthogonal to the optical axis and made conjugate with a predetermined position on the rearward focus side of the second positive lens system by the first and second positive lens systems, a lens to be examined being disposed at said predetermined position, a third positive lens system provided on the side opposite to the second positive lens system with respect to said predetermined position, light-receiving means disposed on the opposite side of the second positive lens system with respect to the third positive lens system, the light-receiving means producing a signal corresponding to the position, on the light-receiving surface of the light-receiving means, of an optical image corresponding to each of the four spot light source means, and converter means for converting the output signals of the light-receiving means into diopters $D_1$, $D_2$ and principal meridians axis degree $\theta$.

3 Claims, 10 Drawing Figures

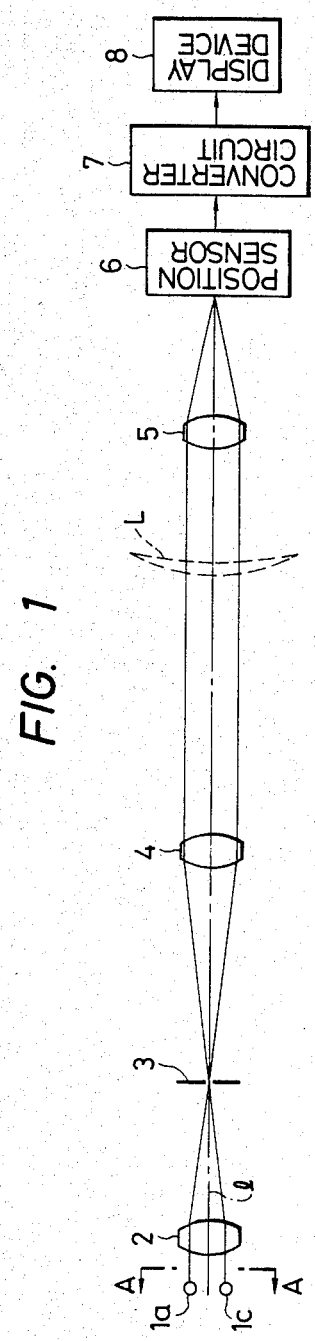
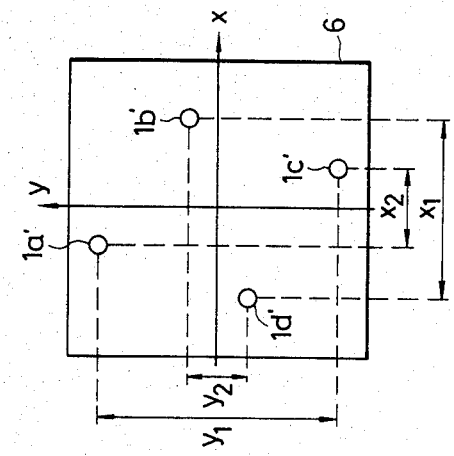
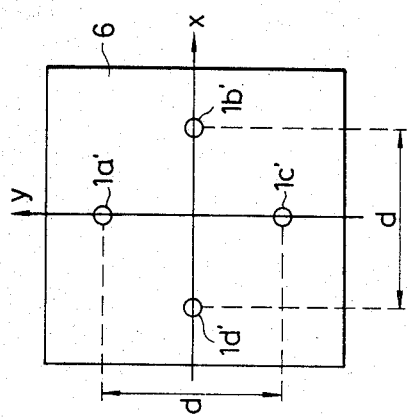
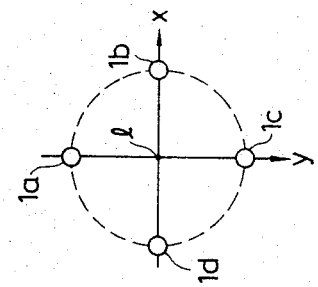
FIG. 1
FIG. 2
FIG. 3
FIG. 4

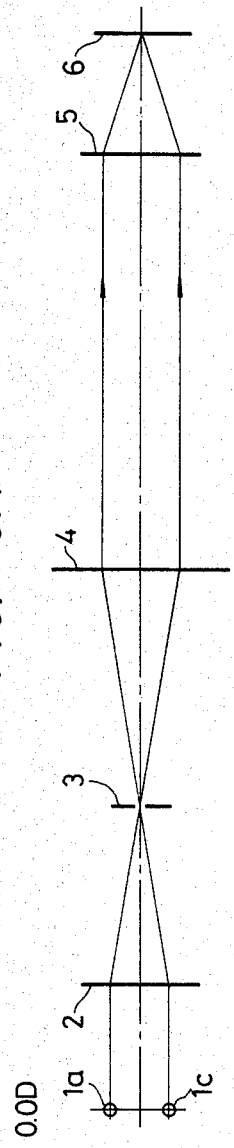
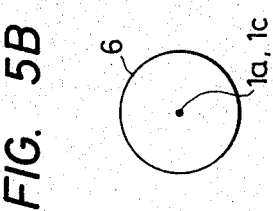
FIG. 5A / FIG. 5B
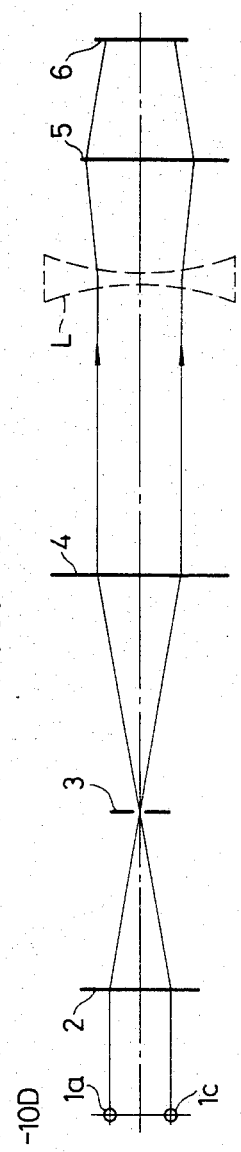
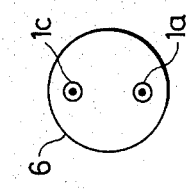
FIG. 6A / FIG. 6B
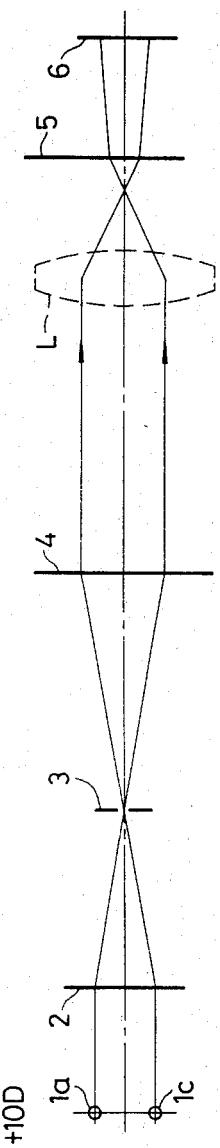
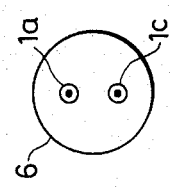
FIG. 7A / FIG. 7B

AUTOMATIC LENS METER

BACKGROUND OF THE INVENTION

1. Field of the Invention

This invention relates to an automatic lens meter for automatically measuring the optical refractive power of spectacle lenses or the like.

2. Description of the Prior Art

A light beam detecting type of lens meter is known. This lens meter utilizes the fact that measurement of the deviated path within a preselected area of excursion is typically equated to various powers of the suspect optical system in sphere, cylinder, cylinder axis and prism. For example, a lens meter with automated readout disclosed in U.S. Pat. No. 4,180,325 is a means of measurement of deviated paths and includes a moving boundary locus with edges of distinctly different shape placed to intercept and occult said deflected beam in a known plane within the area of excursion at a distance from the suspect optical system. The moving boundary locus is arranged for movement along a predetermined path at a velocity within the known plane. The boundary locus includes a first substantially transparent portion, a second substantially opaque portion, and at least two boundaries between the opaque and transparent portions.

However, this lens meter has required a moving boundary locus having a special pattern and accordingly has been complicated in construction.

SUMMARY OF THE INVENTION

It is a first object of the present invention to provide an automatic lens meter which is simple in construction and which can automatically accomplish reading.

It is a second object of the present invention to provide an automatic lens meter which can accomplish measurement within a short time.

It is a third object of the present invention to provide an automatic lens meter in which the optical system has no movable portion and which can accomplish measurement with all parts thereof being stationary.

The invention will become fully apparent from the following detailed description of an embodiment thereof shown in the accompanying drawings.

BRIEF DESCRIPTION OF THE DRAWINGS

FIG. 1 shows the optical system of a preferred embodiment of the present invention.

FIG. 2 is a view taken along arrow A—A of FIG. 1.

FIG. 3 shows light source images formed on a position sensor where the lens to be examined is a spherical lens.

FIG. 4 shows light source images formed on the position sensor where the lens to be examined is a lens including a cylindrical surface.

FIG. 5A shows the optical path when the lens to be examined is not inserted.

FIG. 5B shows the light source image on the position sensor in the case of FIG. 5A.

FIG. 6A shows the optical path where the lens to be examined is a negative lens.

FIG. 6B shows the light source images on the position sensor in the case of FIG. 6A.

FIG. 7A shows the optical path where the lens to be examined is a positive lens.

FIG. 7B shows the light source images on the position sensor in the case of FIG. 7A.

DESCRIPTION OF THE PREFERRED EMBODIMENT

FIG. 1 shows the optical system of an embodiment of the present invention. There are four light sources (only two of which, $1a$ and $1c$, are shown in FIG. 1). As can be seen in FIG. 2 which is a view taken along arrow A—A of FIG. 1, the light sources are disposed equidistantly on a circumference centered at the optical axis 1 and are designated by $1a$ to $1d$. The light sources may be either minute light-emitting diodes or pin-holes illuminated from the back thereof. The positions of the light sources $1a$ to $1d$ in the optical system are made substantially conjugate with the inserted position of a lens L to be examined which is inserted in the optical system by a condenser lens 2 and a collimator lens 4. The rearward focal plane of the condenser lens 2 is coincident with the forward focal plane of the collimator lens 4, and a pin-hole plate 3 is disposed on this coincident focal plane. The pin-hole of the pin-hole plate 3 is so disposed as to include the optical axis 1 of the optical system. Of the four light sources $1a$ to $1d$, those opposed to each other with the optical axis interposed therebetween, namely, the light sources $1a$–$1c$ and the light sources $1b$–$1d$ each form a pair. The position of the pin-hole plate 3 is made conjugate with the surface of a position sensor by the collimator lens 4 and imaging lens 5. Accordingly, the spatial images of the light sources $1a$ to $1d$ are formed at the inserted position of the lens L to be examined, and the pin-hole image of the pin-hole plate 3 is formed on the position sensor 6. The position sensor may be a solid state image pick-up element such as CCD or MOS type image sensor or a known element such as a semiconductor position detector utilizing the "lateral photo effect" in the semiconductor surface to detect the optical image position from a signal obtained by an opposed electrode attached to a surface resistance layer.

The pair of light sources $1a$–$1c$ is imaged on the position sensor 6 as shown in FIG. 5B by an optical path as shown in FIG. 5A. The position sensor 6 produces a signal corresponding to the optical image position thereon, and a converter circuit 7 receives as input from the position sensor 6 a signal corresponding to the position and converts this input signal into diopters $D_1$ and $D_2$ and principal meridians axis degree $\theta$ of the lens L to be examined, as will hereinafter be described. A display device 8 displays those values generated from the converter circuit 7. When the lens L to be examined is inserted into the optical system so that the optical axis of the former is coincident with the optical axis of the latter, the conjugate relation between the position of the pin-hole plate 3 and the position of the position sensor 6 is destroyed, so that four images are formed on the position sensor 6 correspondingly to the light sources $1a$ to $1d$. That is, where the lens to be examined is a negative lens, the light beam emitted from the pair of light sources $1a$–$1c$ reach the position sensor 6 by way of the optical path as shown in FIG. 6A, and where the lens to be examined is a positive lens, the light beams reach the position sensor 6 by way of the optical path as shown in FIG. 7A. Each image becomes a somewhat blurred image on the sensor 6 as shown in FIG. 6B or FIG. 7B. In FIGS. 5B, 6B and 7B, the images of the other pair of light sources $1b$–$1d$ are also created, but they are similar to the images of the light sources $1a$–$1c$ and therefore have been omitted for simplicity.

Assuming that the lens L to be examined in the optical path is a spherical lens, the distance between the images $1a'$ and $1c'$ of the pair of light sources $1a$ and $1c$ on the position sensor 6 is equal to the distance between the images $1b'$ and $1d'$ of the pair of light sources $1b$ and $1d$ on the position sensor 6. It is assumed that the distance between the images $1a'$ and $1c'$ and the distance between the images $1b'$ and $1d'$ is d and that the distance between the spatial images of the light sources $1a$ and $1b$ formed at the inserted position of the lens L to be examined is $d_0$. f is representative of the focal length of the collimator lens 5, and D is representative of the refractive power of the lens L to be examined. Then, where the position sensor 6 is positioned on the focal point of the collimator lens 5, there is established the following relation:

$$d = \frac{d_0 f}{1000} \times D$$

What is important here is that the distance d is proportional to the refractive power D and so in the following description, the proportion constant is assumed to be 1, for simplicity. As described above, the distance d is proportional to the refractive power D and therefore, if the distance d on the position sensor is measured, the refractive power D of the lens L to be examined can be known.

However, where the lens L to be examined in the optical path includes a cylindrical surface, the distance between the images $1a'$ and $1c'$ of the pair of light sources $1a$ and $1c$ on the position sensor 6 is not equal to the distance between the images $1b'$ and $1d'$ of the pair of light sources $1b$ and $1d$ on the position sensor 6 and in addition, under the influence of the torsion by the lens L to be examined, an image is created in a direction inclined by an angle corresponding to the principal meridians direction of the cylindrical lens with respect to the directions x and y of a pair of images formed when a spherical lens as the lens L to be examined has been inserted. That is, in FIG. 4 showing the surface of the position sensor 6, the direction x is the direction in which the images of the pair of light sources $1b$ and $1d$ are formed on the position sensor 6 when a spherical lens has been inserted as the lens L to be examined, and the direction y is the direction in which the images of the pair of light sources $1a$ and $1c$ are formed on the position sensor 6 when a spherical lens has been inserted as the lens L to be examined (see FIG. 3), and it is assumed that when a cylindrical lens has been inserted as the lens L to be examined, the images $1a'$ to $1d'$ of the light sources $1a$ to $1d$ are created on the surface of the position sensor 6, as shown. Now, it is assumed that the distance over which the distance between the images $1a'$ and $1c'$ has been projected in the direction y is $y_1$, the distance over which the distance between the images $1b'$ and $1d'$ has been projected in the direction x is $x_1$, the distance over which the distance between the images $1a'$ and $1c'$ has been projected in the direction x is $x_2$ and the distance over which the distance between the images $1b'$ and $1d'$ has been projected in the direction y is $y_2$. The principal meridians axis degree is given by $\theta$, diopter of the lens to be examined in one principal meridians direction is given by $D_1$ and diopter of the lens to be examined in the other principal meridians direction is given by $D_2$. Then, there are established the following relations:

$$D_1 + D_2 = x_1 + y_1 \quad (1)$$

$$D_1^2 + D_2^2 = x_1^2 + x_2^2 + y_1^2 + y_2^2 \quad (2)$$

$$x_2 = -y_2 = \sin\theta \cdot \cos\theta (D_1 - D_2) \quad (3)$$

Hence, by $$D_1 = \frac{(x_1 + y_1) + \sqrt{(x_1 - y_1)^2 + 2x_2^2 + 2y_2^2}}{2} \quad (4)$$

$$D_2 = \frac{(x_1 + y_1) - \sqrt{(x_1 - y_1)^2 + 2x_2^2 + 2y_2^2}}{2} \quad (5)$$

$$\theta = \frac{1}{2}\sin^{-1}\frac{x_2}{D_1 - D_2}, \quad (6)$$

the data $D_1$, $D_2$ and $\theta$ of the lens L to be examined are obtained. In equations (4) to (6), a suitable proportion constant is actually imposed depending on the manner of setting the optical system, etc., as already described with respect to the case of the spherical lens, but to simplify the description, the proportion constant is selected to 1. That is, as can be seen in equations (4) to (6), the diopters $D_1$ and $D_2$ and the principal meridians axis degree $\theta$ of the lens L to be examined can be obtained by obtaining the distances $x_1$, $x_2$, $y_1$ and $y_2$ over which the distances between corresponding images $1a'$–$1c'$ and $1b'$–$1d'$ have been projected in the directions x and y from the positions of the images $1a'$ to $1d'$ on the position sensor 6 (if the lens to be examined is a spherical lens, $x_1 = x_2 = y_1 = y_2$). That is, as is clear from equations (1) to (3), there are three unknown quantities $D_1$, $D_2$ and $\theta$ and there are three equations and therefore, whatever the proportion constant may be, the unknown quantities $D_1$, $D_2$ and $\theta$ are determined by 1 to 1 relative to the distances $x_1$, $x_2$, $y_1$ and $y_2$. Accordingly, in the actual device, it is difficult to set the proportion constant and therefore, various lenses whose diopters $D_1$, $D_2$ and principal meridians axis degree $\theta$ are known are actually measured in advance so that the distances $x_1$, $x_2$, $y_1$ and $y_2$ are made to correspond to diopters $D_1$, $D_2$ and principal meridians axis degree $\theta$ of the lens L to be examined, and the distances $x_1$, $x_2$, $y_1$ and $y_2$ measured in each lens are made to correspond to the storage addresses, and the diopters $D_1$, $D_2$ and principal meridians axis degree $\theta$ of the lens to be measured corresponding to the distances $x_1$, $x_2$, $y_1$ and $y_2$ are stored in a read only memory circuit in the converter circuit 7 in such a manner that they correspond to the corresponding storage addresses. When a lens whose diopters $D_1$, $D_2$ and principal meridians axis degree $\theta$ are unknown has been inserted into the optical path, the diopters $D_1$, $D_2$ and principal meridians axis degree $\theta$ stored in the memory circuit with the measured distances $x_1$, $x_2$, $y_1$ and $y_2$ as the designation signals of the storage addresses may be read out and the diopters $D_1$, $D_2$ and principal meridians axis degree $\theta$ of the above-described unknown lens can be obtained as the read-out values.

The foregoing description is of an optimum example and for example, the four light sources need not always be such that the directions of the light sources forming each pair as shown in FIG. 2 are orthogonal to each other, but if their directions are known in advance, the positions of the four light source images can be made to correspond to diopters $D_1$, $D_2$ and principal meridians axis degree $\theta$ of the lens.

Also, as can be seen from FIGS. 6B and 7B, in the case of the lenses to be examined which are equal in absolute value and different in sign, the positions of the images on the sensor 6 are the same (the case of the optical system of FIG. 1). Accordingly, a contrivance for automatically judging whether the lens is positive or negative becomes necessary. For that purpose, as can be seen from FIGS. 6A, 6B, 7A and 7B, it is necessary to know in what relation the top and bottom of the light sources 1a and 1c are with the top and bottom of the images. That is, if the blurred images corresponding to the light sources 1a and 1c are reverse to the positions of the light sources (FIGS. 6A and 6B), the lens to be examined is a negative lens, and if said blurred images remain as they are (FIGS. 7A and 7B), the lens to be examined is a positive lens. As a specific technique for detection, if the position of the optical axis of the optical system, namely, the position at which the images 1a to 1d of FIG. 5B overlap one another, is the origin, the light sources 1a and 1b are alternately turned on and whether the lens to be examined is positive or negative can be judged by the positive or the negative of the y coordinates value generated from the position sensor 6 when the light source 1a has been turned on.

Also, although it depends on the construction of the position sensor 6, the design may be such that the four light sources 1a to 1d are turned on at a time to thereby obtain the positions of four light source images and if, as described above, the design is such that the light sources are successively turned on with the discrimination between the convexity and the concavity of the lens to be examined taken into account and the then coordinates value is stored in the memory circuit in such a manner that it corresponds to the turned on light source, it will become possible to know the position of each light source image from the store value in the memory circuit.

Further, in FIG. 1, the pin-hole plate 3 has been made conjugate with the position sensor 6 by the lenses 4 and 5, whereas this is not a requisite construction. That is, if the pin-hole plate 3 is made conjugate with the position sensor 6 by the lenses 4 and 5, the images of the four light sources 1a to 1d concentrate upon a point on the position sensor 6 when there is no lens to be examined and thus, discrimination between the positive and the negative of the lens to be examined becomes easy and adjustment of the optical system, etc. also becomes easy, but even if the two are not in the conjugate relation, the image positions and the diopters and principal meridians axis degree correspond to 1 to 1 and therefore, measurement can be accomplished in a similar manner.

I claim:

1. An automatic lens meter including:
   (a) a first positive lens system;
   (b) a second positive lens system whose optical axis is coincident with the optical axis of the first positive lens system, the second positive lens system having its forward focal plane coincident with the rearward focal plane of said first positive lens system;
   (c) a pin-hole plate disposed in the forward focal plane of said second positive lens system, the optical axis of said first positive lens system and said second positive lens system passing through the pin-hole of said pin-hole plate;
   (d) four spot light source means disposed on the side of the forward focal plane of said first positive lens system, said four spot light source means being provided equidistantly on a circumference centered at said optical axis, two of the light source means at opposite sides of the optical axis forming a first pair, the remaining two of the light source means forming a second pair, said four spot light source means being made conjugate with a predetermined position on the side of the rearward focal plane of said second positive lens system by said first and second positive lens systems, a lens to be examined being disposed at said predetermined position;
   (e) a third positive lens system provided on the side opposite to said second positive lens system with respect to said predetermined position;
   (f) light-receiving means disposed at a fixed position relative to and conjugate with said pin-hole plate with respect to said second and third positive lens systems, said light-receiving means producing a signal corresponding to the position, on a light-receiving surface of said light-receiving means of an optical image corresponding to each of said four spot light source means; and
   (g) converter means for converting the output signals of said light-receiving means into diopters $D_1$, $D_2$ and principal meridians axis degree $\theta$, said converter means having a converting circuit for defining as an X-direction the direction connecting the images of said first pair of the light source means formed on the light-receiving means, and as a Y-direction the direction connecting the images of said second pair of the light source means formed on the light-receiving means, when a spherical lens as the lens to be examined is disposed at said predetermined position, said converting circuit, when an arbitrary lens to be examined is disposed at said predetermined position, producing signals corresponding to distances $x_1$ and $y_2$ over which the distance between the images of said first pair of the light source means formed on the light-receiving means and distances $x_2$, $y_1$ over which the distance between the images of said second pair of the light source means formed on the light-receiving means are projected in said X-direction and Y-direction, said converter means thereby determining said diopters $D_1$, $D_2$ and principal meridians axis degree $\theta$ based on said signals corresponding to distances $x_1$, $y_2$, $y_1$ and $y_2$.

2. The automatic lens meter according to claim 1, wherein said converter means further has an operational circuit for effecting, as diopter $D_1$, an operation proportional to $$\frac{(x_1 + y_1) + \sqrt{(x_1 - y_1)^2 + 2x_2^2 + 2y_2^2}}{2},$$

effecting, as diopter $D_2$ an operation proportional to $$\frac{(x_1 + y_1) - \sqrt{(x_1 - y_1)^2 + 2x_2^2 + 2y_2^2}}{2}$$

and effecting, as the principal meridians axis degree $\theta$, an operation $$\frac{1}{2}\sin^{-1}\frac{x_2}{D_1-D_2}.$$

3. The automatic lens meter according to claim 1, wherein said converter means has a memory circuit, and said memory circuit is a read only memory circuit which uses as the storage addresses the positions of optical images created on the light-receiving surface of said light-receiving means and stores the diopters $D_1$, $D_2$ and principal meridians axis degree $\theta$ in the corresponding storage addresses, and receives the output signals of said light-receiving means as the address designation signals for reading.

* * * * *